United States Patent [19]

Lyall

[11] 4,094,537
[45] June 13, 1978

[54] GROUND LEVEL METER RISER

[76] Inventor: Robert W. Lyall, 9770 El Greco Cir., Fountain Valley, Calif. 92708

[21] Appl. No.: 719,613

[22] Filed: Sep. 1, 1976

[51] Int. Cl.$^2$ .................. F16L 11/12; F16L 33/00
[52] U.S. Cl. ........................... 285/47; 285/55; 285/370
[58] Field of Search ............. 285/45, 47, 15, 176, 285/331, 55, 370, 238, 239, 256, 371

[56] References Cited

U.S. PATENT DOCUMENTS

| | | | |
|---|---|---|---|
| 3,222,094 | 12/1965 | Robinson | 285/256 |
| 3,596,933 | 8/1971 | Luckenbill | 285/331 |
| 3,638,684 | 2/1972 | Pavilon | 285/15 |
| 3,817,559 | 6/1974 | Tricini | 285/174 |
| 3,819,207 | 6/1974 | Leopold | 285/45 |
| 3,993,334 | 11/1976 | Fridman | 285/370 |
| 4,005,880 | 2/1977 | Anderson | 285/47 |

FOREIGN PATENT DOCUMENTS 724,536  12/1965  Canada .................................. 285/55

Primary Examiner—Reinaldo P. Machado

[57] ABSTRACT

Ground level gas meter risers for plastic service lines in which the riser is a one-piece assembly for transition from underground plastic to above ground steel gas service lines. The riser assembly includes a mounting section of pipe connected to a plastic transition fitting. The plastic fitting in turn receives the plastic tube gas carrier. A steel casing or jacket extends from the plastic fitting around the plastic gas carrier tube for a predetermined distance to a sealing device. An upper protective steel casing interconnects the mounting pipe and the upper end of the lower protective casing. A relatively thin epoxy or plastic coating extends from under the seal device at the lower end of the riser to above the upper casing.

8 Claims, 3 Drawing Figures

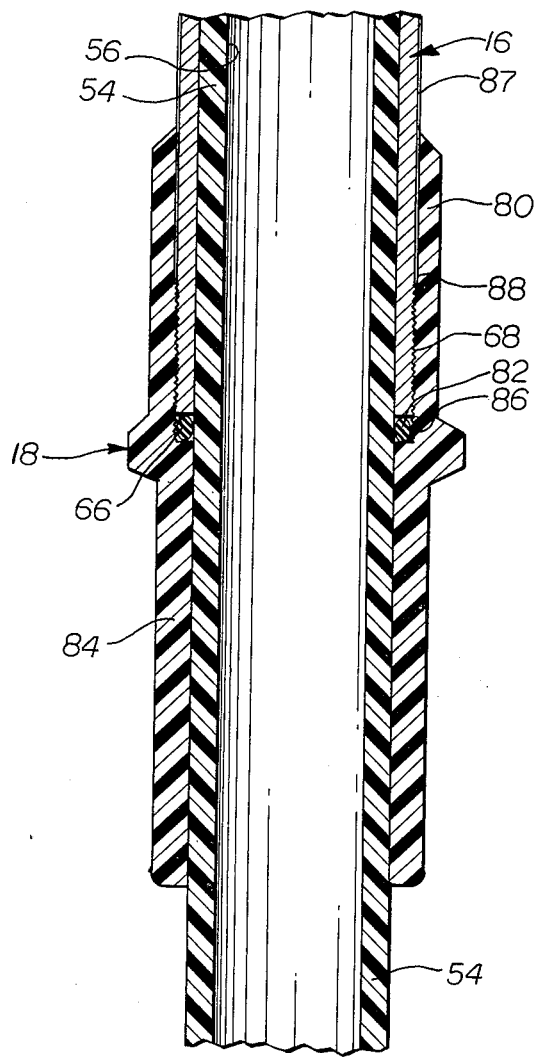
Fig. 3
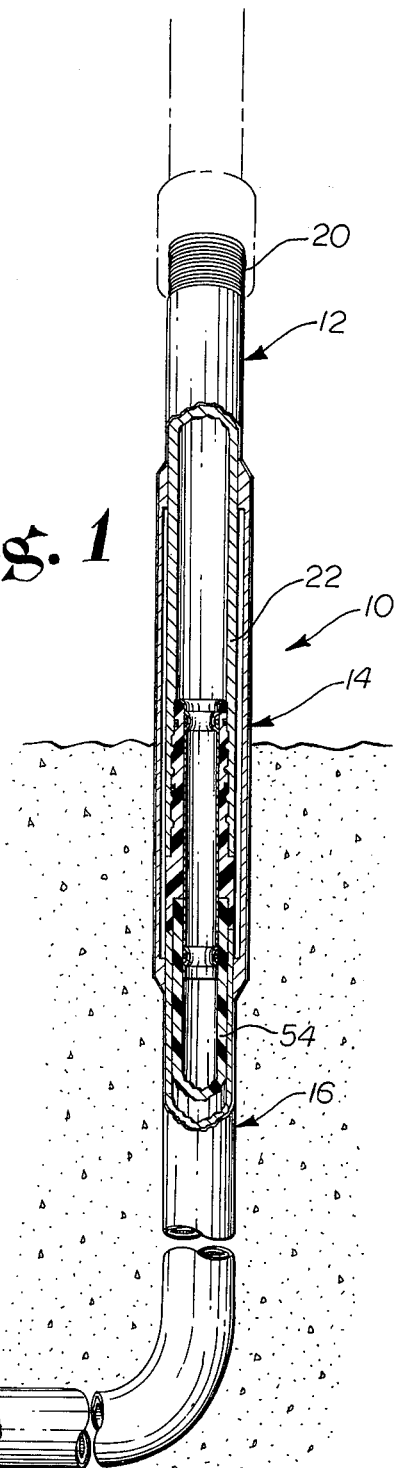
Fig. 1
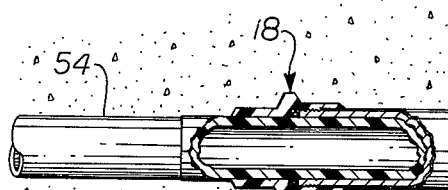

GROUND LEVEL METER RISER

BACKGROUND OF THE INVENTION

The invention relates to a gas meter riser assembly and more particularly to a one piece ground level gas meter riser for connecting a plastic service line to a metering apparatus and valve.

As those skilled in the art are aware, until recent years the gas service lines extending from gas mains to the individual users such as residences and businesses were primarily metal such as steel. The all metal service lines to meter installation proved satisfactory except that the service lines and riser pipes occasionally corroded and had to be replaced. In time, government regulatory agencies promulgated minimum regulations for the safety of volatile fuel lines. One of the regulations was that any underground steel gas line was required to be protected with corrosion preventive coatings and have cathodic protection. While larger distribution and transmission lines already were coated and cathodically protected, distribution systems below for example approximately 100 PSI, had no cathodic protection. There had been some movement in the natural gas utilities toward the use of plastic pipe prior to effective regulation and legislation but the advent of regulatory rulings obviously encouraged and hastened the use of plastic pipe. Within a relatively few years practically all gas companies went to plastic service, as a result of which approximately 90% of the use today is plastic. Plastic service lines can only be used for pressures up to a maximum of 64 PSI. Additionally, plastic cannot be used above ground because it is not strong enough. Steel underground requires an anode at a determinable annual maintenance cost with yearly inspection to be sure that it is functioning properly. It can thus be appreciated that the need is for a safe transition assembly from underground plastic to above ground steel so that the need for cathodic protection and all of the accompanying expense and trouble is eliminated.

Typical prior art references are as follows: U.S. Pat. Nos. 3,819,207; 3,533,649; 3,858,914; 3,838,686; and 3,222,094.

SUMMARY OF THE INVENTION

A ground level riser assembly for gas meters and the like including an above ground mounting section of pipe with threads at the upper end thereof for receiving the meter valve. The steel mounting section at its lower end is coupled with a plastic transition fitting to which the underground plastic carrier pipe or tube is fused. An interior stiffener extends from the upper end of the plastic transistion fitting, if desired, to a point inside the connection area of the carrier to the plastic fitting. A thin wall steel casing butts up against the plastic fitting outside the carrier tube and extends downwardly and then bends to a generally horizontal direction. The plastic carrier pipe emerges from the lower end of the carrier casing at which point a moisture seal device is attached to the lower end of the casing for preventing moisture from leaking or migrating into the space between the steel casing and the plastic carrier. Extending from below ground where it is welded to the upper end of the carrier casing is an upper casing which envelops and extends over the transition fitting area and upwardly to a predetermined point on the mounting pipe. A spacer may be used around the carrier casing and around the mounting pipe so that the upper casing is radially spaced outwardly from the transition area to define an elongated annular space in which a thermal insulation may be inserted if desired. Finally, a thin coating of plastic is disposed from under the seal at the lower end of the riser assembly to above the upper end of the upper casing but below the threads for mounting or connecting to the meter valve.

Accordingly, it is among the many features, advantages and objects of this invention to provide a ground level meter riser which eliminates the need for cathodic protection since there is no below ground metal gas carrier and no above ground plastic carrier. The upper casing and thermal insulation positively protects the plastic transition fitting from house or grass fires inasmuch as it has no degradeable material above ground and hence no real upper heat limit. The device causes the least amount of pressure drop for those companies operating in lower pressure ranges. It provides firm meter and regulator support and by the very nature of its construction, has superior resistance to torque imposed during valve and meterset installation. Thus, the invention is stronger and has positive plastic to steel mounting pipe pull-out resistance. Since it is a unitary assembly, there are no field assembly operations thus eliminating the possibility of human error and the need for special tools. No part of the steel except the mounting pipe above ground functions as a carrier. The remainder of the steel in the assembly is a non-carrier and functions as a protective sleeve. The device is shock resistant and provides high mechanical strength. The seal means at the lower end of the riser assembly is a water and/or moisture seal and offers shear protection for the plastic gas tube coming out of the lower casing eliminating the bending movement where plastic tube enters the steel casing. Additionally, the top of the transition fitting is well below the threads on which the meter and regulator are to be mounted.

BRIEF DESCRIPTION OF DRAWINGS

FIG. 1 is an environmental view showing an entire riser assembly;

FIG. 3 is an enlarged cross-section area of the lower end of the riser assembly showing the construction of the seal means.

DESCRIPTION OF PREFERRED EMBODIMENT

Figure 2:
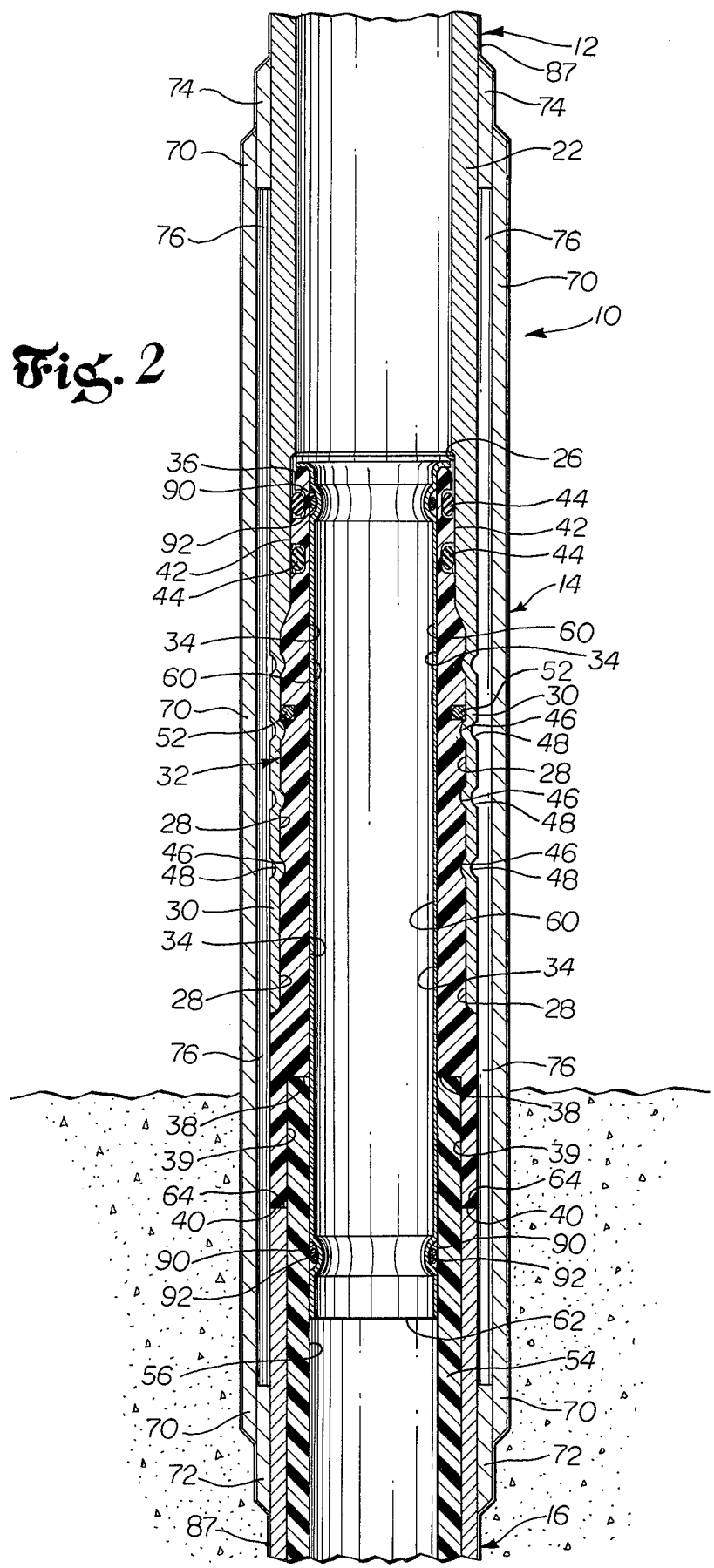
FIG. 2 is a detailed enlargement in cross-section of the broken-away portion of FIG. 1 to further illustrate the details of the riser.

The unitary riser assembly, generally designated by the number 10, is comprised of a connector or mounting pipe 12, a transition fitting and upper casing section 14, an underground casing section 16 and a casing-carrier seal means 18. The mounting section 12 is preferably made of standard schedule 40 black steel pipe but could, if desired, be made of stainless or galvanized steel. It includes external threads 20 at its upper end for connection to the meter valve. Mounting pipe 12 has wall 22 which as can be seen in the drawing in the lower portion thereof, is internally specially formed to accommodate a plastic transition fitting as set forth in U.S. Pat. No. 3,222,094. The features and structural relationship between the lower end of mounting pipe 12 and the plastic transition fitting are described in detail in the referenced patent and are here incorporated as a part of the riser assembly combination and will again be described in detail. Mounting pipe 12 has a lower end 24 and inwardly of the lower end 24 it includes a radial outwardly offset sealing surface 26. Downwardly from the relatively short sealing surface 26 is a locking surface 28 which is further radial outwardly offset to define a relatively thin locking wall section 30.

A plastic transition fitting, generally designated by the number 32, has an interior bore 34 extending from its upper end 36 to a radially offset surface 38 which is spaced inwardly from its lower end 40. The plastic fitting has a co-acting sealing surface 42 with grooves therein for O-ring seals 44. Over that portion of the plastic transition fitting engaging interior surface 28 of steel wall 30, is a series of arcuate annular grooves 46 into which the steel is roll formed by formation of grooves 48. The steel roll-formed grooves, of course, are after the plastic member 32 and the steel have been fitted together so that they are locked together. As can be seen, an additional grove 50 is formed as shown to accommodate a steel ring 52 which adds additional pull-apart resistance to the manner in which the plastic and the steel are locked together. Plastic carrier pipe 54 is fused onto offset surface 38 and secondary bore 39 at the lower end of the plastic transition fitting thus providing the inside diameter 56 of the plastic gas carrier tube which is dimensionally approximately the same as bore 34 of the transition fitting.

From the upper end of the transition fitting is a thin walled aluminum liner 60 extending downwardly past the lower end 40 to a lower end 62 within the gas carrier pipe or tube itself. The aluminum liner may have an "O" ring at each end for positive gas sealing between liner and gas carrier tube. The length of liner 60 will vary depending upon where the user desires to have ground level with respect to the plastic fitting. In other words, it is necessary that the aluminum metal liner extend at least to ground level and preferably slightly below. In any event, and because of regulations, it is necessary that no plastic gas carrier be located above grade or ground level. Thus, the aluminum liner is the gas carrier above ground and is not effected by the maximum 100° F temperature regulations. The thinned wall lower steel casing 16 has an upper end 64 which butts the lower end 40 of the plastic transition fitting. The lower end 66 of the lower casing terminates at the seal 18. It will be seen that the lower end of the steel casing 16 is provided with threads 68 for receiving the seal 18. The seal means 18 has an enlarged threaded front section 80 with co-acting threads to engage threads 68 of the steel jacket. A reduced wall portion 84 is provided in the seal with approximately the same inside diameter as the outside diameter of carrier 54. There is defined by the two sections of the seal a radial offset surface 86. An O-ring 82 is disposed between the end 66 of the steel jacket and the radial offset surface 86 to accommodate the O-ring 82. Again, the seal means 18 with its O-ring 82 protects the riser assembly from moisture migrating into the area between the plastic carrier tube 54 and the steel jacket 16 to deter internal corrosion. In addition, the seal means at the end of the steel jacket lends shear strength to the carrier tube at a point where it would otherwise be vulnerable to damage.

To impart strength and protection to the transition area 14, an external or upper casing 70 extends from a predetermined distance above the upper end 36 of the transition fitting to a point below the lower end 40 of the plastic transition fitting 32. A spacer 72 may be provided at the upper end of casing 16 and a spacer 74 is provided on the mounting pipe preferably by welding. The casing 70 is then welded to the spacers to define an annular elongated cavity 76 which may be left void or which more preferably may be supplied with a polyethylene or other equivalent thermal barrier liner. In this way, not only is strength added to the overall riser assembly and particularly in the transition area, but thermal insulation is provided for the plastic transition fitting so that it is protected against excessively high temperatures resulting from possible house or grass fires. It is to be understood that the upper casing 70 may be welded directly to the mounting pipe and lower casing by eliminating spacers 72 and 74. Elimination of the spacers places the upper casing 70 closer to the wall 30 thus removing the annular cavity 76. Again, the aluminum liner 60 of the fitting 32 functions as the carrier above the ground level point. Finally, it will be seen that a coating of thin film epoxy or plastic 87 extends from the outer end of the seal as at 88 to the welds securing the casing 70 and spacers 74 to mounting pipe wall 22 to protect lower casing and other steel parts against corrosion.

While the requirements of various users will vary, it is desirable that the upper end 36 of the plastic transition fitting 32 be located well below, as for instance 4–6 inches, the upper end or threads of mounting pipe 12. It will be noted that near the lower and upper ends of stiffener 60 there is located an annular groove 90 having O-ring 92 to prevent gas or product from leaking or percolating into the interface area between the stiffener and bore 30 of the fitting. Again, the aluminum liner 60 is the gas carrier above ground and is not limited to 100° F maximum operating limits imposed on plastic above ground.

What is claimed is:

1. A ground level riser for gas meters and the like for connecting the same to a plastic service line, comprising:
    (a) a section of metal mounting pipe adapted to receive a valve and meter or the like a predetermined distance above ground level,
    (b) a plastic transition fitting connected and joined to the inside surface of said mounting pipe, and having an inner first bore, said plastic fitting having on its end away from said mounting pipe a shorter second bore radially outwardly offset from said first bore,
    (c) a predetermined length of a plastic product carrying tube received in and joined to said second bore so that said first bore is generally co-dimensional in diameter with the inside diameter of said tube,
    (d) a relatively thin wall lower steel protective casing externally of said tube having an upper end and a lower end and abutting said plastic fitting at its upper end and extending over a predetermined length of said length of tube, said first protective casing being bent if desired to give a specified amount of horizontal and vertical run in said riser, said lower protective casing being generally coaxial with said mounting pipe and plastic transition fitting and further being generally of the same external diameter as said mounting pipe and as at least a portion of said plastic transition fitting,
    (e) a seal means at the lower end of said lower protective casing for sealing the space inside of said lower casing and outside said tube from water and other containment fluids and materials,
    (f) an upper protective steel casing secured to and extending from below ground level and below the upper end of said lower protective casing to said mounting pipe above said transition fitting, said upper casing being generally of larger diameter than either said lower casing or said mounting pipe and secured as by welding to both, and (g) a protective coating of plastic extending over said riser from said seal means to above that end of said upper casing which is secured to said mounting pipe.

2. The ground level riser according to claim 1 and in which said seal means includes an enlarged annular portion with internal threads for being received on co-acting threads provided on the outer end of said lower casing, and further including a flexible O-ring seal member disposed at the inner end of said enlarged portion for engaging both the outer surface of said tube and the end of said lower casing to create a seal against the migration of moisture inside said lower casing.

3. The ground level riser according to claim 1 and in which said upper casing is spaced radially outwardly from said mounting pipe and plastic transition fitting to define an elongated annular space in which is disposed thermal insulation material for protecting said plastic transition fitting from damage by excessive external heat.

4. The ground level riser according to claim 1 and in which a relatively thin walled inner metallic liner extends from the top of said plastic transition fitting to a point either in said first bore or into said gas carrier tube depending upon the positioning of said riser relative to ground level.

5. The ground level riser according to claim 4 in which the upper end of said plastic transition fitting and said metallic liner are spaced a predetermined distance below the upper end of said mounting pipe to allow the mounting pipe to be unobstructed on its interior for such distance.

6. The ground level riser according to claim 5 and in which said metallic liner is provided with an external annular groove at least at its upper end and a resilient seal means in said annular groove to seal the interface area between said liner and said first bore against migration of gas therein.

7. The ground level riser according to claim 1 and in which said upper casing is radially outwardly spaced from said mounting pipe and plastic transition fitting to define an elongated annular space for protecting said plastic transition fitting from excessive external heat.

8. The ground level riser according to claim 1 and in which said upper casing is of such dimensions that essentially no annular space is defined between said upper casing and the mounting pipe and plastic transition fitting.

* * * * *